United States Patent [19]
Moffett

[11] Patent Number: 5,343,006
[45] Date of Patent: Aug. 30, 1994

[54] PANEL MOUNT SWITCH ASSEMBLY

[75] Inventor: Gary L. Moffett, Vancouver, Wash.

[73] Assignee: Thrustmaster, Inc., Tigard, Oreg.

[21] Appl. No.: 36,141

[22] Filed: Mar. 24, 1993

[51] Int. Cl.⁵ .............................................. H01H 9/08
[52] U.S. Cl. .................... 200/296; 200/345; 248/27.3
[58] Field of Search ............... 200/295, 296, 341, 345, 200/302.2, 331, 333, 307; 248/27.1, 27.3

[56] References Cited
U.S. PATENT DOCUMENTS

| | | | |
|---|---|---|---|
| 3,213,189 | 10/1965 | Mitchell et al. | 200/295 X |
| 3,941,965 | 3/1976 | Piber | 200/296 |
| 4,139,755 | 2/1979 | Hastings et al. | 200/296 X |
| 4,156,804 | 5/1979 | Piber | 200/296 |
| 4,163,136 | 7/1979 | Piber | 200/296 |
| 4,220,808 | 9/1980 | Fujita | 200/296 X |
| 4,406,936 | 9/1983 | Ohashi | 200/296 |
| 4,687,164 | 8/1987 | Bakhaus et al. | 248/27.3 |
| 4,943,694 | 7/1990 | Kroth | 200/345 X |
| 5,066,842 | 11/1991 | Yamagata et al. | 200/345 |
| 5,146,056 | 9/1992 | Kuczynski | 200/296 |
| 5,256,841 | 10/1993 | Zanella | 200/296 |

Primary Examiner—Glenn T. Barrett
Attorney, Agent, or Firm—Marger, Johnson, McCollom & Stolowitz

[57] ABSTRACT

A panel mount switch assembly for mounting a pushbutton actuator switch on an opening in a panel. The switch assembly including a switch base holder connected to the switch base, a pair of legs connected to the base holder and positioned to protrude through the actuator opening along opposite sides of the switch actuator, and a switch plunger that engages the actuator. The legs are inserted into the opening and a lip formed on a distal end of each leg extends over the panel to prevent the legs from disengaging from the opening when a downward force is applied to the switch actuator. Once the legs are engaged with the opening, the switch plunger is attached to the switch actuator by inserting the actuator in a channel formed in the plunger and thereby frictionally engage the actuator with the plunger.

17 Claims, 1 Drawing Sheet

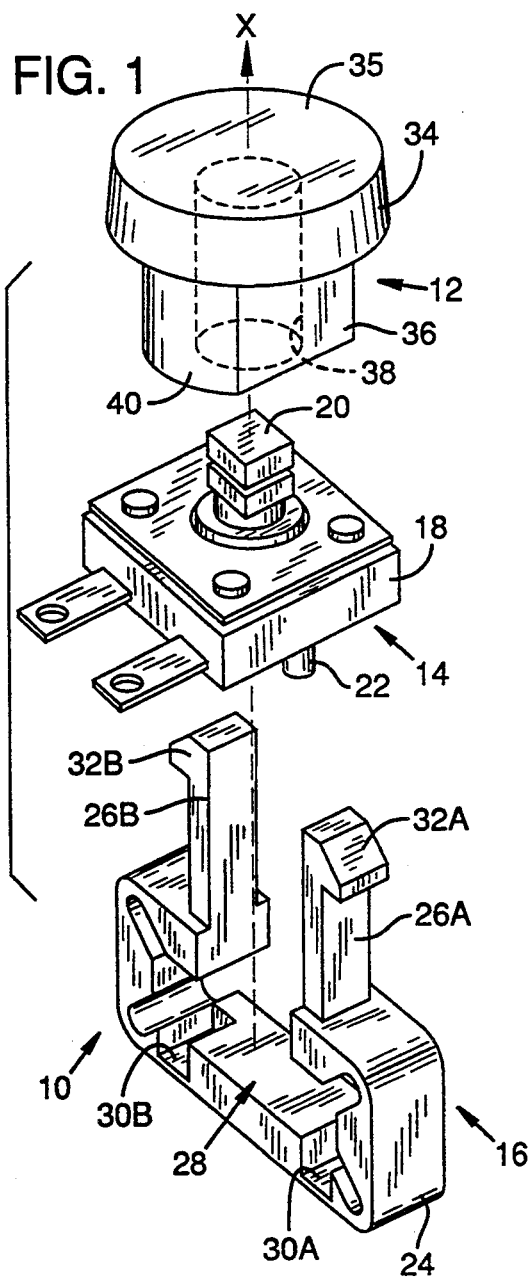
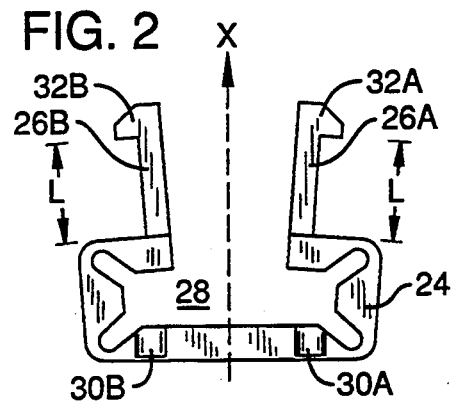
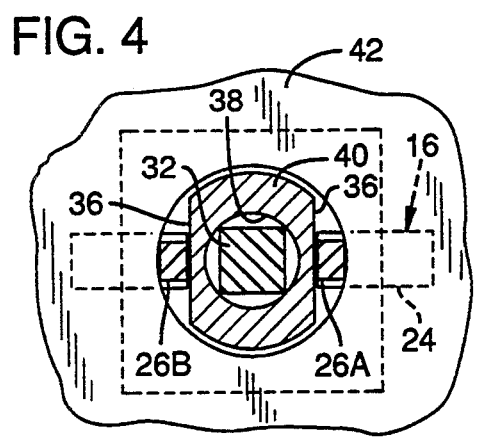
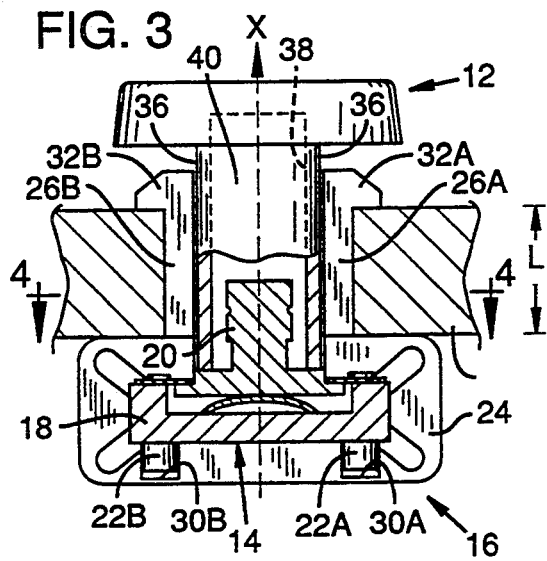

PANEL MOUNT SWITCH ASSEMBLY

BACKGROUND OF THE INVENTION

This invention relates generally to switches and more particularly to panel mount switch assemblies.

The need to mount push-button type switches to panels has long existed. For example, in aircraft cockpits, panel mount switches are common place. There are a myriad of switches mounted on the aircraft cockpit panel, controlling everything from landing gear to windshield wipers.

In order to securely mount the switches on the cockpit panel, relatively expensive mounting assemblies are used. The mounting assembly consists of a switch holder, which encloses the switch itself, a threaded hollow cylinder attached to the switch holder, and a threaded nut which screws on the cylinder. Typically, the cylinder and nut are made of metal to avoid stripping the threads when the nut is screwed onto the cylinder.

The panel mount assembly is attached to the switch such that the push-button actuator of the switch extends along the inside of the threaded cylinder. The threaded cylinder is then inserted into a hole in the panel from a backside of the panel. The hole is size slightly larger than the outer circumference of the cylinder such that the cylinder easily slips into the hole. The size of hole, however, must be smaller than the outer circumference of the nut such that when the nut is screwed onto the cylinder, the nut pulls the switch holder against the backside of the panel, resulting in the switch being fixedly mounted on the panel. Obviously the switch holder must be larger than the hole to prevent the switch holder from being pulled through the hole when the nut is applied to the cylinder.

Although the aforementioned mounting assembly is relatively simple, the cost of manufacturing and the difficulty of assembly, in certain cases, can be prohibitive. Accordingly, a need remains for an inexpensive panel mount switch assembly.

SUMMARY OF THE INVENTION

It is, therefore, an object of the invention is to provide a panel mount switch assembly which can be quickly and inexpensively mounted.

Another object of the invention is to provide such an assembly which eliminates threads from mounting.

A panel mount switch assembly includes a switch base holder which supports the switch, a pair of legs which engage with an opening in the panel where the switch is to be mounted, and a switch plunger which acts against an actuator. The switch base holder has a central opening formed therein which is designed to receive the switch base. Guide grooves are formed in the switch base for precisely aligning the switch actuator between the legs. The legs are splayed for generating a force against the actuator opening to retain the legs in the actuator opening when the legs are engaged with the opening. The switch plunger serves the dual purpose of acting against an actuator and also acts to limit the travel of the actuator which limits the amount of force applied to the switch.

The panel mount switch assembly mounts the switch to the backside of a panel at the opening. The switch is placed in the switch holder and the legs are inserted into the opening. Once the legs are fully inserted into the opening, a lip at the distal end of each leg extends over the panel and prevents the legs from disengaging when a force is applied to the actuator. The switch plunger is inserted between the legs and engages with the actuator.

An advantage of the invention is that switches can be mounted from only a single side of the panel, eliminating the need to reach both sides of the panel.

A further advantage of the invention is that it does not use threads which can be stripped.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 is an exploded perspective view of a panel mount switch assembly.

FIG. 2 is a elevation view of a switch holder with splayed legs.

FIG. 3 is a cross section of the switch assembly mounted on a panel.

FIG. 4 is a cross section of the switch assembly taken along line 4—4.

DETAILED DESCRIPTION

In FIG. 1, a panel mount switch assembly 10 is shown consisting of a switch plunger 12 and a switch holder 16. The switch assembly 10 mounts on a panel (not shown in FIG. 1) quickly and cost-effectively. The switch assembly 10 permits the switch 14 to be mounted on a backside of the panel such that the switch 14 can be actuated from a topside of the panel. The method of assembling the switch assembly and mounting the switch to the panel are described further in the "Operation" section below.

The switch 14 shown is a typical, inexpensive push-button type dome switch. The invention requires simply that the switch have some sort of base and an actuator. The switch 14 shown has a rectangular base 18 with an actuator stem 20 centrally positioned on a topside of the base 18. The invention is not limited to the size and shape of the base 18 and/or actuator 20. The embodiment shown would simply have to be modified to accommodate a different sized switch. In addition, positioning protrusions 22 are formed on a bottomside of the base 18. There are normally two protrusions formed on the bottomside of the base positioned midway along the base 18 and lying in the same plane as the actuator stem 20. Typically, for inexpensive applications, the switch base 18, actuator stem 20, and protrusions 22 are formed of plastic.

The switch assembly 10 includes a switch base holder 16 as shown in FIGS. 1 and 2. The holder 16 includes a pair of legs 26A, 26B connected to a rectangular base holder 24. The holder 16 has a rectangular opening 28 formed therein for receiving the switch base 18. The opening is sized so that the switch base 18 can slide into the opening 22. When the switch base 18 is fully engaged in the holder 24, the actuator stem 20 is aligned in the same plane as the legs 26A, 26B, with the legs 26A, 26B on opposite sides of the stem 20.

In the preferred embodiment, in order to facilitate positioning the switch base 18 in the holder 24, the holder 24 has guide grooves 30A, 30B formed along a bottom side of the opening for receiving the protrusions 22 on the bottom side of the switch 14. The grooves 30A, 30B are channeled slightly further than halfway along the bottom side of the opening 28 so that the actuator stem 30 is positioned in the same plane as the legs 26A, 26B when the protrusions 22 are fully inserted into the grooves 30.

The legs 26A, 26B are connected to the base holder 24 and are slightly splayed. The legs are designed to be inserted into an actuator opening in the panel (not shown in FIGS. 1 and 2) and engage therewith. The legs 26A, 26B are splayed for generating a force against the actuator opening to retain the legs in the actuator opening when the legs are engaged with the opening. Optionally, the legs 26A, 26B can have serrations formed along a side of the legs in contact with the panel to engage with grooves or threads formed on the panel along the actuator opening.

In the preferred embodiment, the legs 26A, 26B have a length "L" approximately equal to the thickness of the panel. This allows the legs to be fully inserted into the opening, as shown in FIG. 3. At a distal end of each leg, protrusions 32A, 32B are formed to engage the legs with the panel to resist a downward force applied to the switch actuator stem, when the switch is actuated and engaged with the holder 24. The protrusions 32A, 32B form lips that extend over the panel when the legs 32A, 32B are inserted into the actuator opening. Optionally, the legs 26A, 26B can be made an integral part of the switch base 18.

The switch mount assembly 10 also includes a switch plunger 12. The switch plunger 12 has a button portion 34 and a vertical plunger member 36. The button portion 34 has a top contoured side 35 and a bottom side attached to the vertical plunger member 36. In the preferred embodiment, the plunger member 36 has two parallel planar sides and two curved sides. Each planar side is aligned opposite a leg when inserted into the actuator opening to prevent the plunger member 36 from rotating about an actuator stem axis "X", as shown below.

The plunger member 36 has a central channel 38 extending from a bottom side 40 of the plunger member 36. The circumference of the channel 38 is sized to circumscribe the switch actuator stem 20. Thus, the actuator stem 20 can be inserted into the channel 38 and in so doing frictionally engage with the channel 38.

OPERATION

The method of mounting the switch 14 to a backside of a panel 42 through an actuator opening is a quick three step process. The reduced number of steps allows for a large number of switches to be mounted in a relatively short period of time, dramatically reducing assembly time.

The method consists of connecting the legs 32A, 32B to the switch base 18 on opposite sides of the actuator stem 20, engaging legs 32A, 32B within the opening in the panel, and mounting the switch plunger 16 on the actuator stem 20. The switch 14 is mounted to the panel 42, according to the method, in FIG. 3. The switch 14 is mounted so that the actuator stem 20 is positioned along the actuator axis "X", which is normal to the panel.

The process of connecting the legs to the switch includes sliding the switch base 18 into the opening 28 of the base holder 24 along the grooves 30A, 30B. The grooves position the switch in the holder such that the actuator stem 20 is positioned along the actuator axis X. As indicated above, alternatively, the legs 32A, 32B can be formed as an integral part of the switch base 18 and, thereby, eliminate this step.

Once the switch 14 is attached to the legs 32A, 32B, the legs are engaged with the actuator opening in the panel 42. The process of engaging the legs with the actuator opening include inserting the legs fully into the actuator opening so that the protrusions 32A, 32B extend over the top side of the panel. The legs, by virtue of being splayed, apply an outward force on the actuator opening which prevents the legs from slipping through the opening once the legs are engaged. The protrusions 32A, 32B resist downward any force applied to the actuator stem by the plunger 12 when the actuator is actuated.

The plunger 12 is mounted on the actuator stem by aligning the parallel sides of the plunger member with the legs and inserting the plunger member 40 between the legs 32A, 32B. The channel 38 of the plunger member 40 envelops the actuator stem 20 as shown in the cross section taken about 4—4. The cross section 4—4, as shown in FIG. 4, shows the actuator stem circumscribed by the channel 38. By sizing the channel 38 to circumscribe the actuator stem 20, the plunger frictionally engages with the actuator stem and prevents the plunger from falling out.

In order to limit the amount of downward force that can be applied to the switch, the height of the vertical plunger member 40 can be limited. The height of the vertical plunger member 40 is limited so that the displacement between the bottom side of plunger button 34 and the top side of the panel 42 is approximately equal to the maximum travel of the actuator stem 20. In this way, once the actuator stem is fully depressed, the plunger button will contact the top of the panel 42 and, thus, prevent further force being applied to the actuator stem 20.

Having described and illustrated the principles of the invention in a preferred embodiment thereof, it should be apparent that the invention can be modified in arrangement and detail without departing from such principles.

I claim all modifications and variation coming within the spirit and scope of the following claims:

1. A panel mount switch assembly comprising:
   a panel having a front side and a back side and a switch actuator opening defined about an axis intersecting the sides of the panel;
   a switch having a switch base positioned adjacent the backside of the panel and a switch actuator stem for actuating the switch extending axially along the axis;
   a switch base holder having the switch base slidably received therein adjacent the back side of the panel;
   a pair of legs connected to the base holder, each having a distal end positioned to protrude through the actuator opening beyond the front side of the panel along opposite sides of the actuator stem; and
   engagement means for securing the legs to the panel to resist a downward force applied to the switch actuator stem when the switch is actuated, the engagement means including protrusions formed at the distal ends of the legs to engage the legs with the frontside of the panel to resist a downward force applied to the actuator stem when the switch is actuated; and
   a switch plunger having a top side for depressing, a plunger member sized to extend through the actuator opening and a bottom side, the bottom side of the plunger member adapted for engaging the actuator stem, the plunger member inserted between the pair of legs such that the opening in the bottom side of the plunger member engages the actuator stem when the switch is received in the switch base holder and sized to fit between the pair of legs so as to prevent withdrawal of the protrusions from engagement with the frontside of the panel.

2. A panel mount switch assembly according to claim 1 wherein the switch base includes a rectangular cross section taken about the actuator stem normal to the switch base; and the switch base holder includes a rectangular opening formed therein for receiving the switch base.

3. A panel mount switch assembly according to claim 1 wherein the pair of legs are splayed for generating a force against the actuator opening to retain the legs in the actuator opening when the legs are inserted in the opening.

4. A panel mount switch assembly according to claim 1 wherein the engagement means includes a lip formed on a distal end of each leg opposite the switch base holder, the lip extending away from the plunger opening so that the lip extends over the panel when the legs are inserted into the opening to prevent the legs from disengaging from the opening when a downward force is applied to the switch actuator stem.

5. A panel mount switch assembly according to claim 1 in which the switch actuator opening is circular and the pair of legs are resiliently biased radially apart to engage the panel within the opening.

6. A panel mount switch assembly comprising:

a panel having a front side and a back side and a switch actuator opening defined about an axis intersecting the sides of the panel;

a switch having a switch base positioned adjacent the backside of the panel and a switch actuator stem for actuating the switch extending axially along the axis;

a switch base holder having the switch base slidably received therein adjacent the back side of the panel;

a pair of legs connected to the base holder and positioned to protrude through the actuator opening beyond the front side of the panel along opposite sides of the actuator stem;

first engagement means for securing the legs to the panel to resist a downward force applied to the switch actuator stem when the switch is actuated;

a switch plunger having a top side for depressing and a bottom side for engaging the actuator stem the bottom side positioned in the switch actuator opening; and second engagement means for securing the bottom side of the plunger to the switch actuator stem comprising a channel formed in the bottom side of the plunger, the channel having an opening sized to circumscribe the actuator stem such that the channel frictionally engages the actuator stem.

7. A panel mount switch assembly comprising:

a panel having a front side and a back side and a switch actuator opening defined about an axis intersecting the sides of the panel;

a switch having a switch base positioned adjacent the backside of the panel and a switch actuator stem for actuating the switch extending axially along the axis;

a switch base holder having the switch base slidably received therein adjacent the back side of the panel;

a pair of legs connected to the base holder and positioned to protrude through the actuator opening beyond the front side of the panel along opposite sides of the actuator stem; and first engagement means for securing the legs to the panel to resist a downward force applied to the switch actuator stem when the switch is actuated;

the switch base including one or more protrusions formed on a bottom side of the switch base; and the switch base holder having grooves formed therein for receiving the protrusions for positioning the switch actuator stem directly under the switch actuator opening in the panel.

8. Apparatus for connecting a switch having a switch base and a switch actuator stem to a backside of a panel having a predetermined thickness at an actuator opening formed through the panel, the mounting assembly comprising:

a switch base holder adapted to receive the switch base;

a pair of legs connected to the base holder and positioned to protrude through the actuator opening along opposite sides of the actuator stem and having protrusions formed at a distal end of the legs to engage the legs with the panel to resist a downward force applied to the switch actuator stem when the switch is actuated; and a switch plunger having a plunger member sized to extend through the actuator opening and an opening on a bottom side of the plunger member adapted for engaging the actuator stem, the plunger member insertable between the pair of legs such that the opening in the bottom side of the plunger member frictionally engages the actuator stem when the switch is received in the switch base holder.

9. The mounting assembly of claim 8 wherein the switch base holder includes a top side and a bottom side, the holder having a central opening defined therein, the central opening defined by a cross section of the switch base and having a plunger opening formed in the top side of the holder, the plunger opening having a left side and a right side, the switch positioned in the holder such that the switch actuator stem is located within the plunger opening.

10. The mounting assembly of claim 9 wherein the pair of legs comprises:

a left leg mounted on the top side of the holder at the left side of the plunger opening extending away from the top side of the holder, the left leg having a lip at a distal end of the leg, the lip extending away from the plunger opening, the left leg having a length, as defined between the top side of the holder and the lip, substantially equal to the thickness of the panel; and a right leg mounted on the top side of the holder at the right side of the plunger opening extending away from the top side of the holder, the right leg having a lip at a distal end of the leg, the lip extending away from the plunger opening, the right leg having a length, as defined between the top side of the holder and the lip, substantially equal to the thickness of the panel, the left and right legs inserted into the switch actuator opening such that the lips extend over the panel to secure the base holder to the panel, wherein the tips are normally biased apart for generating a force against the actuator opening to retain the legs in the actuator opening when the legs are inserted in the opening.

11. The mounting assembly of claim 8 wherein the switch plunger comprises:
   a button portion having a top contoured side and a bottom side; and
   a plunger member attached to the bottom side of the button portion, the plunger member having a top side and a bottom side, and having a channel formed on the bottom to circumscribe the switch actuator stem, the plunger member inserted between the right and left legs such that the opening in the bottom side of the plunger member frictionally engages the actuator stem.

12. The mounting assembly of claim 11 wherein the plunger member includes a two substantially parallel sides separated by a distance substantially equal to a length of the plunger opening wherein the plunger does not rotate within the actuator opening when inserted between the legs.

13. A method of mounting a switch having a switch base and a switch actuator stem to a backside of a panel of a predetermined thickness through a switch actuator opening defined about a switch actuator axis normal to the panel, the method comprising:
   slidably mounting the switch on a switch base holder;
   connecting a pair of legs to the switch base holder on opposite sides of the actuator stem, the legs having lips at distal ends thereof extending radially away from the actuator stem at a spacing from the base holder substantially equal to the thickness of the panel;
   inserting the actuator stem and pair of legs within the opening with the switch base holder on the backside of the panel and engaging the lips at the distal ends of the legs with a frontside of the panel to resist withdrawal of the switchbase holder from the opening when the switch actuator is depressed; and
   mounting a switch plunger on the actuator stem, the switch plunger being formed with a plunger member having a central opening for receiving the actuator stem, the plunger member protruding through the opening between the pair of legs and sized to block inward deflection of the legs for disengagement of the lips with the frontside of the panel.

14. A method of mounting a switch according to claim 13 wherein the mounting step comprises sliding the switch base into an opening formed in the switch base holder along grooves formed along a bottom side of the opening.

15. A method of mounting a switch according to claim 13 in which the switch actuator opening is circular and the pair of legs are resiliently biased radially apart to engage the panel within the opening.

16. A method of mounting a switch according to claim 13 wherein the mounting step comprises:
   inserting the actuator stem into a channel formed in the plunger member;
   and
   frictionally engaging the actuator stem with the channel.

17. A method of mounting a switch to a planar panel having a predetermined thickness and a switch actuator opening defined about a switch actuator axis perpendicular to the panel, the method comprising:
   providing a switch having a switch base and a switch actuator stem for actuating the switch;
   providing a switch base holder having a top side and a bottom side, the holder having a central opening defined therein, the central opening defined by a cross section of the switch base and having an plunger opening formed in the top side of the holder, the plunger opening having a left side and a right side, the switch base holder having left and right legs mounted on the right and left sides of the plunger opening, respectively, extending away from the top side of the holder, the legs having lips at a distal end extending away from the plunger opening, the legs having a length, as defined between the top side of the holder and the lip, substantially equal to the thickness of the panel;
   placing the switch in the switch base holder;
   inserting the legs of the switch base holder through the switch actuator opening in the panel wherein the lips extend over the panel to prevent the base holder from sliding out of the actuator opening;
   providing a switch plunger having a vertical plunger member having a top side and a bottom side, and having a top portion mounted on the top side of the plunger member, the plunger member having an opening on the bottom side of the plunger member defined by the circumference of the switch actuator stem;
   inserting the switch plunger member between the legs of the switch base holder; and
   frictionally engaging the switch actuator stem with the opening in the bottom side of the switch plunger member.

* * * * *